(12) United States Patent
Blount et al.

(10) Patent No.: US 9,440,492 B1
(45) Date of Patent: Sep. 13, 2016

(54) SELECTIVELY DEPLOYABLE WHEEL ASSEMBLY ATTACHMENT

(71) Applicants: Harold Blount, Conyers, GA (US); Andrew L Calloway, Sr., Conyers, GA (US); Gonzales Calloway, Sr., Conyers, GA (US)

(72) Inventors: Harold Blount, Conyers, GA (US); Andrew L Calloway, Sr., Conyers, GA (US); Gonzales Calloway, Sr., Conyers, GA (US)

( * ) Notice: Subject to any disclaimer, the term of this patent is extended or adjusted under 35 U.S.C. 154(b) by 0 days.

(21) Appl. No.: 14/877,927

(22) Filed: Oct. 7, 2015

(51) Int. Cl.
*B60B 37/04* (2006.01)

(52) U.S. Cl.
CPC ................... *B60B 37/04* (2013.01)

(58) Field of Classification Search
CPC ..... B62B 3/02; B62B 11/10; B62B 2204/24; B62B 5/0083; B62B 2310/305; B62B 3/186
See application file for complete search history.

(56) References Cited

U.S. PATENT DOCUMENTS

| | | | |
|---|---|---|---|
| 5,280,767 A | 1/1994 | Goetz | |
| 5,653,194 A | 8/1997 | Guy | |
| 5,701,843 A | 12/1997 | Lazides | |
| 5,832,874 A | 11/1998 | Ravin | |
| 6,507,975 B2 * | 1/2003 | Maupin | B60B 33/0005 16/19 |
| 7,152,554 B2 | 12/2006 | Crawford | |
| 8,141,885 B2 * | 3/2012 | Fan | B60B 33/0007 16/32 |
| 8,500,142 B1 * | 8/2013 | Rebai | A63B 55/60 248/96 |
| 8,584,618 B1 | 11/2013 | Batson et al. | |

* cited by examiner

*Primary Examiner* — John Walters
*Assistant Examiner* — James Triggs
(74) *Attorney, Agent, or Firm* — The Keys Law Firm PLLC

(57) ABSTRACT

A selectively deployable wheel assembly attachment for attaching to a conventional animal cage, often in pairs, to allow the cage to be rolled when desired without compromising the cage's general stability on a flat surface. The selectively deployable wheel assembly attachment includes a wheel assembly which includes a conventional wheel which is connected to an axle member and a fixed attachment mechanism which includes an attachment plate and an attachment elbow. In some embodiments, the selectively deployable wheel assembly attachment additionally includes an auxiliary support assembly which includes an adjustment plate and an adjustment loop for providing enhanced stability when the wheel assembly is in its deployed position.

11 Claims, 5 Drawing Sheets

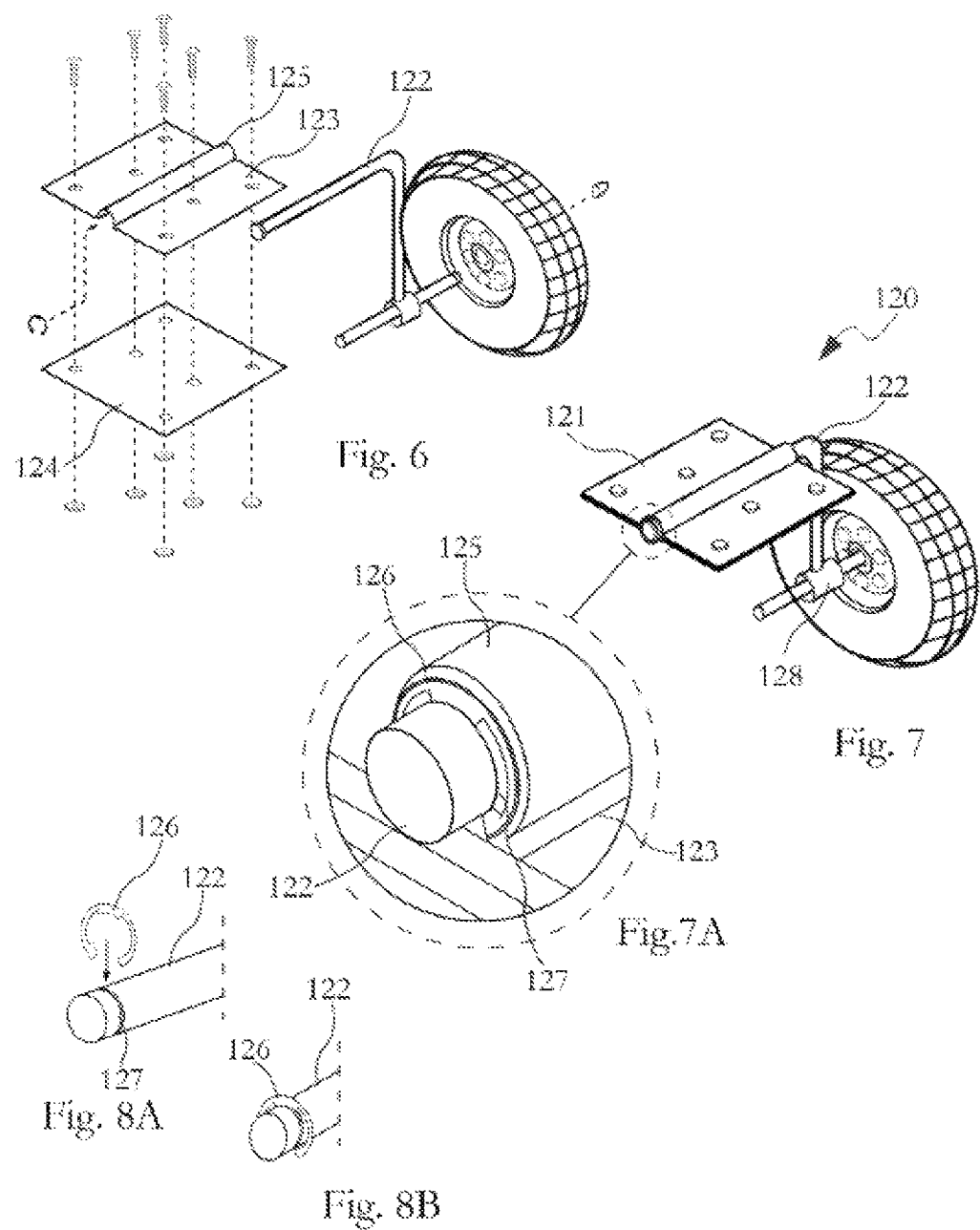

US 9,440,492 B1

SELECTIVELY DEPLOYABLE WHEEL ASSEMBLY ATTACHMENT

BACKGROUND OF THE INVENTION

1. Field of the Invention

This invention relates generally to mobility attachments and, more particularly, to a selectively deployable wheel assembly attachment for use with an animal cage.

2. Description of the Prior Art

The use and design of conventional animal cages by anyone ranging from pet owners to zookeepers to confine or capture animals is well known. Because animal cages conventionally define an enclosure made of mesh, bars or wires that is optimized to contain whatever animal is to be placed or trapped inside, many of such cages, particularly the larger ones, are often very difficult to move around (particularly without harming the animal(s) inside). Moreover, moving smaller cages can even present problems due to the dimensions of the enclosure as well as the uneven distribution of weight due to the animal(s) inside. While cages many often be moved using wheeled platforms of various types, such platforms are generally not something that can be integrated with the cage without compromising its stability.

Accordingly, a problem which still exists is that conventional animal cages generally lack integrated structures which can improve its mobility without compromising its stability when the cage is not desired to be moved. Thus, there remains a need for a wheel assembly attachment for use with an animal cage which can be attached to a conventional animal cage to provide a selectively deployable wheel. It would be helpful if such a selectively deployable wheel assembly attachment was operative to be positioned in either a deployed position or a storage position. It would be additionally desirable for such a selectively deployable wheel assembly attachment to include an optional auxiliary support assembly for use to provide additional stability.

The Applicant's invention described herein provides for a selectively deployable wheel assembly attachment adapted to allow a user to selectively deploy and store a wheel on a cage so as to facilitate mobility without compromising stability. The primary components in Applicant's selectively deployable wheel assembly attachment are a wheel assembly, a fixed attachment mechanism, and an auxiliary support assembly. When in operation, the selectively deployable wheel assembly attachment configures a cage for ease of movement without affecting the stability of the cage when movement is not desired. As a result, many of the limitations imposed by prior art structures are removed.

SUMMARY OF THE INVENTION

A selectively deployable wheel assembly attachment for attaching to a conventional animal cage, often in pairs, to allow the cage to be rolled when desired without compromising the cage's general stability on a flat surface. The selectively deployable wheel assembly attachment includes a wheel assembly which includes a conventional wheel which is connected to an axle member and a fixed attachment mechanism which includes an attachment plate and an attachment elbow. In some embodiments, the selectively deployable wheel assembly attachment additionally includes an auxiliary support assembly which includes an adjustment plate and an adjustment loop for providing enhanced stability when the wheel assembly is in its deployed position.

It is an object of this invention to provide a wheel assembly attachment for use with an animal cage which can be attached to a conventional animal cage to provide a selectively deployable wheel.

It is another object of this invention to provide a selectively deployable wheel assembly attachment was operative to be positioned in either a deployed position or a storage position.

It is yet another object of this invention to provide a selectively deployable wheel assembly attachment to include an optional auxiliary support assembly for use to provide additional stability.

These and other objects will be apparent to one of skill in the art.

BRIEF DESCRIPTION OF THE DRAWINGS

FIG. 6 is an exploded side perspective view of a selectively deployable wheel assembly attachment built in accordance with a first fixed attachment mechanism embodiment of the present invention.

FIG. 7 is a side perspective view of a selectively deployable wheel assembly attachment built in accordance with a first fixed attachment mechanism embodiment of the present invention.

FIG. 7A is a sectional side perspective view of FIG. 7 showing the end of an attachment elbow of a selectively deployable wheel assembly attachment built in accordance with a first fixed attachment mechanism embodiment of the present invention.

FIG. 8A is a sectional side perspective view of the end of an attachment elbow of a selectively deployable wheel assembly attachment built in accordance with a first fixed attachment mechanism embodiment of the present invention.

FIG. 8B is a sectional side perspective view of the end of an attachment elbow of a selectively deployable wheel assembly attachment built in accordance with a first fixed attachment mechanism embodiment of the present invention.

DETAILED DESCRIPTION OF THE INVENTION

Figure 1:
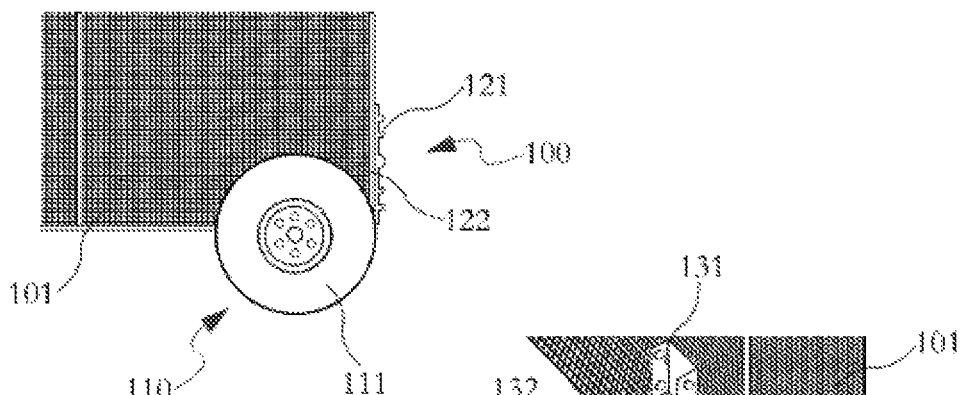
FIG. 1 is a side perspective view of a selectively deployable wheel assembly attachment built in accordance with the present invention in place on a cage in a deployed position.
Figure 2:
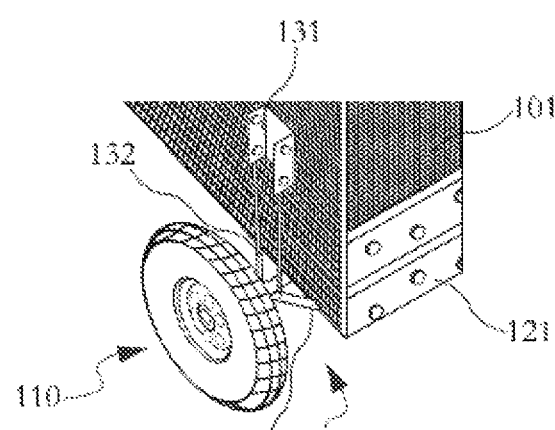
FIG. 2 is a rear perspective view of a selectively deployable wheel assembly attachment built in accordance with the present invention in place on a cage in a deployed position with an auxiliary support assembly.
Figure 3:
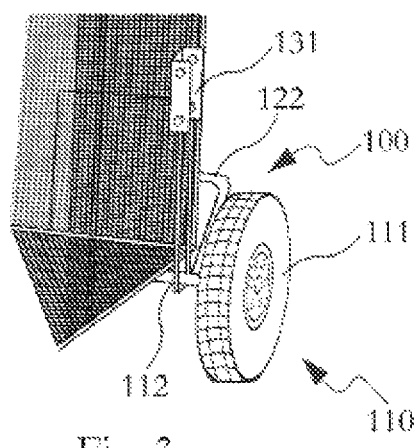
FIG. 3 is a front perspective view of a selectively deployable wheel assembly attachment built in accordance with the present invention in place on a cage in a deployed position with an auxiliary support assembly.
Figure 4:
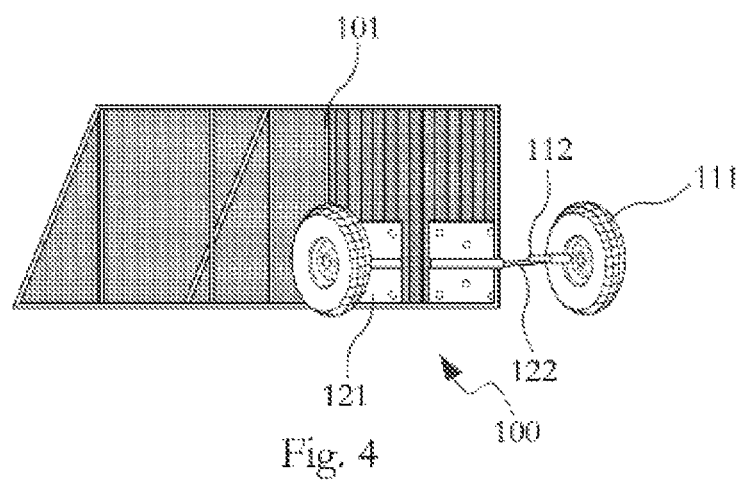
FIG. 4 is a side perspective view of a selectively deployable wheel assembly attachment built in accordance with the present invention in place on a cage in a storage position.
Figure 5:
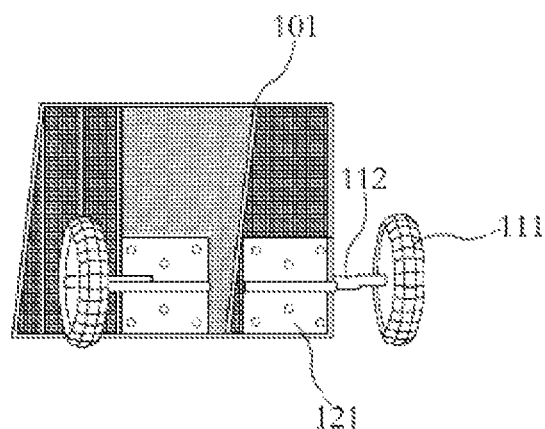
FIG. 5 is a rear perspective view of a selectively deployable wheel assembly attachment built in accordance with the present invention in place on a cage in a storage position.
Figure 9:
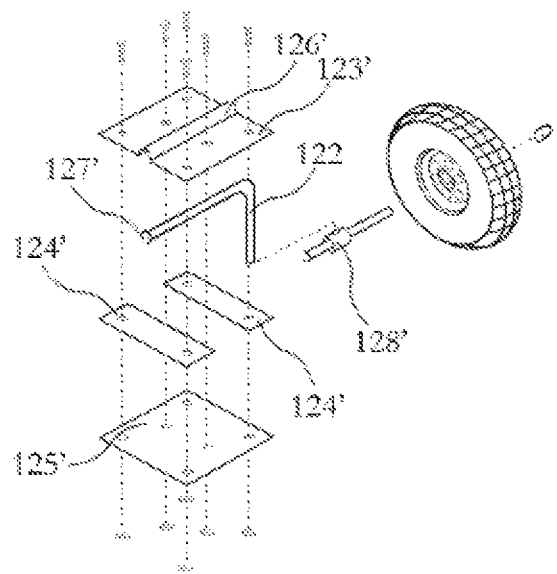
FIG. 9 is an exploded side perspective view of a selectively deployable wheel assembly attachment built in accordance with a second fixed attachment mechanism embodiment of the present invention.
Figure 10:
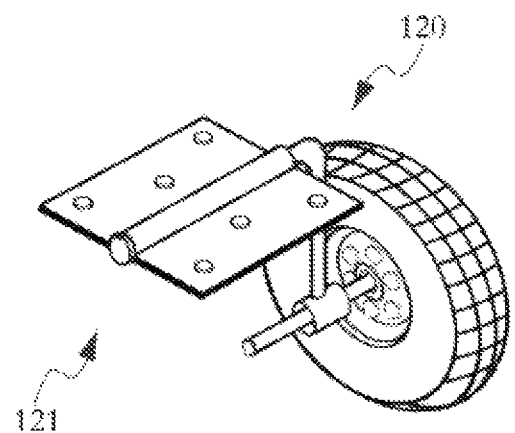
FIG. 10 is a side perspective view of a selectively deployable wheel assembly attachment built in accordance with a second fixed attachment mechanism embodiment of the present invention.
Figure 11:
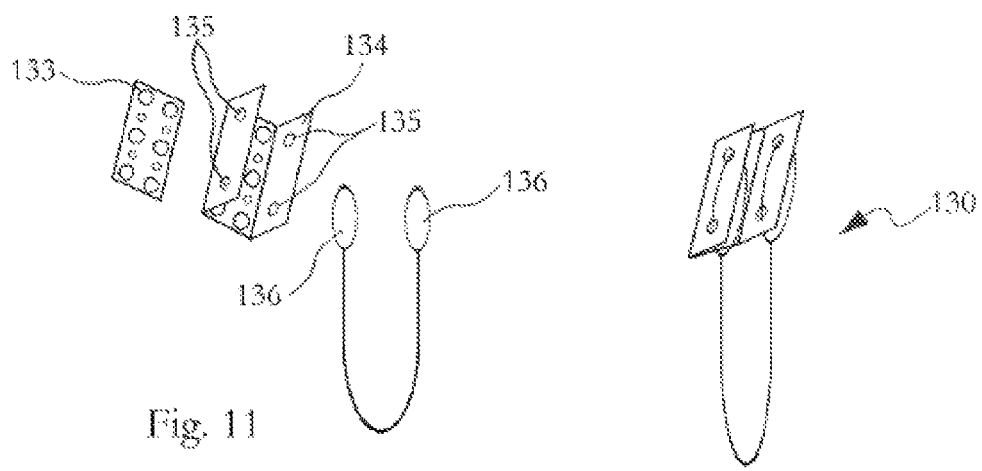
FIG. 11 is an exploded side perspective view of an auxiliary support assembly and wheel assembly of a selectively deployable wheel assembly attachment built in accordance with the present invention.
Figure 12:
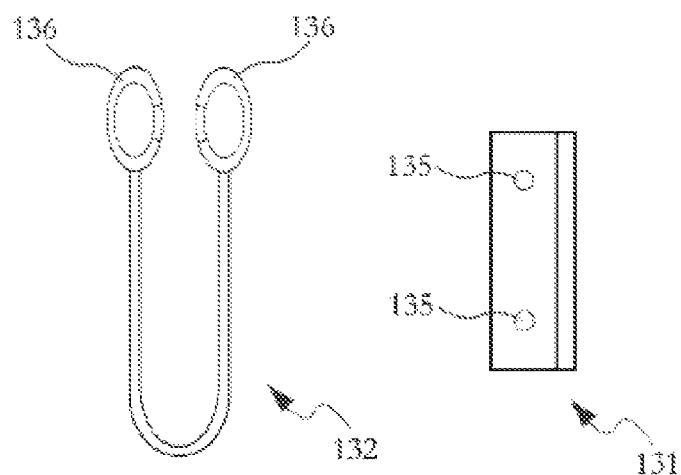
FIG. 12 is a side perspective view of an auxiliary support assembly a selectively deployable wheel assembly attachment built in accordance with the present invention.
Figure 13:
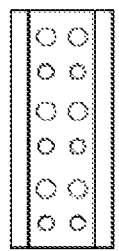
FIG. 13 is a front elevational view of an adjustment plate of an auxiliary support assembly of a selectively deployable wheel assembly attachment built in accordance with the present invention.
Figure 14:
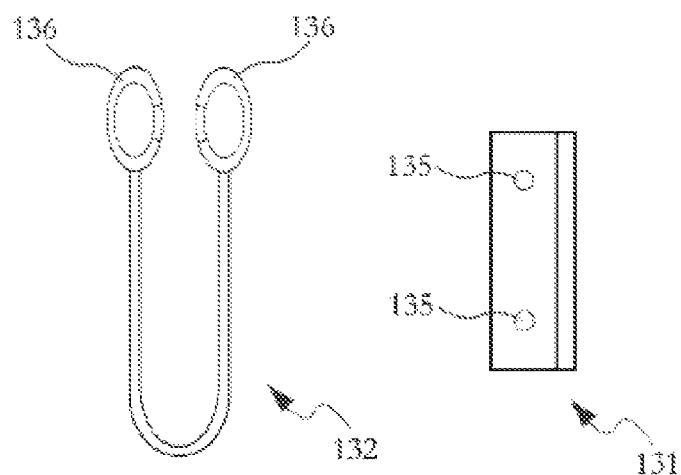
FIG. 14 is a front elevational view of a positioning body of an adjustment plate of an auxiliary support assembly of a selectively deployable wheel assembly attachment built in accordance with the present invention.
Figure 15:
FIG. 15 is a side elevational view of an adjustment plate of an auxiliary support assembly of a selectively deployable wheel assembly attachment built in accordance with the present invention.

Referring now to the drawings and in particular FIGS. 1, 2, 3, 4, and 5, a selectively deployable wheel assembly attachment 100 is shown having a wheel assembly 110 and a fixed attachment mechanism 120, and an auxiliary support assembly 130. The wheel assembly 110 defines a conventional wheel 111 which is connected to an axle member 112. The fixed attachment mechanism 120 includes an attachment plate 121 and an attachment elbow 122. The auxiliary support assembly 130 defines an adjustment plate 131 and an adjustment loop 132. The fixed attachment mechanism 120 is employed to attach the selectively deployable wheel assembly attachment 100 to a conventional cage 101 such that it may be swung between a deployed position as illustrated in FIGS. 1-3 and a storage position as illustrated in FIGS. 4-5. The auxiliary support assembly 130 may be employed when the selectively deployable wheel assembly attachment 100 is in the deployed position to provide enhanced stability and support for the wheel assembly 110, which would otherwise be only stabilized through the force of gravity causing the cage 102 to rest on the axle member 112.

Referring now to FIGS. 1, 2, 3, 4, 5, 6, 7, 7A, 8A, and 8B, in a first embodiment of the fixed attachment mechanism 120, the attachment plate 121 of the fixed attachment mechanism 120 defines a tube plate component 123 and a bottom plate component 124 which are fixedly stacked together through a plurality of elongated fasteners. The tube plate component 123 includes a tube portion 125 welded thereon so as to provide a channel for the attachment elbow 122 to rotatably positioned therein. The bottom plate component 124 provides a planar surface to be placed against the surface of a conventional animal cage 101 and attached thereto with conventional fasteners (which may be the same fasteners which fixed the attachment plate 121 together). Advantageously, through this design, the attachment elbow 122 is able to freely rotate inside the tube portion 125 without contacting the surface of the conventional animal cage 101 to which the fixed attachment mechanism 120 is attached.

At the end of the attachment elbow 122 opposite its integration with the attachment plate 121 is an axle loop 128 suitable for allowing the axle member 112 to be inserted therein and to rotate while positioned therein. In one embodiment, the attachment elbow 122 includes an end groove 127 sized to removably receive an e-clamp 126 so as to allow the end to be selectively held inside the tube portion 125, preventing it from sliding out.

Referring now to FIGS. 1, 2, 3, 4, 5, 9 and 10, in a second embodiment of the fixed attachment mechanism 120, the attachment plate 121 of the fixed attachment mechanism 120 defines three discrete layers of component plates which are fixedly stacked together through a plurality of elongated fasteners. The uppermost layer defines a top component plate 123' which includes an arcuate recess 126' shaped to create a space for the attachment elbow 122 to be positioned between top component plate 123' and the other layers of component plates. The middle layer defines two discrete spacer plates 124' and the lowermost layer defines a bottom component plate 125'. The bottom component plate 125' provides a planar surface to be placed against the surface of a conventional animal cage 101 and attached thereto with conventional fasteners (which may be the same fasteners which fixed the attachment plate 121 together). Advantageously, through this design, the attachment elbow 122 is able to freely rotate without contacting the surface of the conventional animal cage 101 to which the fixed attachment mechanism 120 is attached or even the bottom component plate 125'.

In the second embodiment, the end of the attachment elbow 122 opposite its integration with the attachment plate 121 is threaded to allow it to engage an axle tube 128' having a threaded aperture in its surface. It is appreciated that the threaded end of the attachment elbow 122 may be attached to the threaded aperture of the axle tube in order to couple the fixed attachment mechanism 120 and wheel assembly 110 in a manner which allows the axle member 112 to rotate while positioned in the an axle tube 128'. In the alternative, axle tube 128' may be fixed to the end of the attachment elbow 122 and allow the axle member 112 to be inserted therein and to rotate while positioned therein.

In this embodiment, the attachment elbow 122 includes an end ridge 127' sized to prevent it from sliding out of the arcuate recess 126' when in place between the uppermost component plate 123' and the two spacer plates 124'.

In either the first or second embodiment of the fixed attachment mechanism 120, when the selectively deployable wheel assembly attachment 100 attached to a conventional animal cage 101, the attachment plate 121 is fixed to a side of the cage 101 and the axle member 112 is slid through the axle tube 128'/axle loop 128, thereby operatively associating the wheel assembly 110 with the fixed attachment mechanism 120. By swinging the wheel assembly 110 into the storage position, defined by the wheel assembly 110 being positioned such that it is behind (or to the side) of the cage 101, the wheel assembly 110 can simply rest on a ground surface and not affect the stability of the cage. On the other hand, by swinging the wheel assembly 110 into the deployed position, such that the distal end axle member 112 relative to the wheel 111 is underneath the cage 101, enables the deployable wheel assembly attachment 100 to support the cage 101 off the ground so that it can be rolled by action of the wheel 111.

It is contemplated that a cage 101 may outfitted with at least two selectively deployable wheel assembly attachments 100 to facilitate balanced rolling.

Referring now to FIGS. 2, 3, 11, 12, 13, 14, and 15, in embodiments employing the auxiliary support assembly 130, the adjustment plate 131 defines a planar fixed plate 133 and a docking plate 134 fixedly stacked together through a plurality of elongated fasteners. The fixed plate 133 provides a planar surface to be placed against the surface of the conventional animal cage 101 and attached thereto with conventional fasteners (which may be the same fasteners which fixed the adjustment plate 131 together). The docking plate 134 includes two pairs of height selecting apertures 135. Each pair of apertures 135 is positioned together on at different heights along the docking plate 134 such that when the adjustment plate 131 is in place on an animal cage resting on a ground surface, the pairs are different distances from the ground surface.

The adjustment loop 132 defines a U shaped member which includes a snap hook 136 at each end. The snap hooks 136 enable the adjustment loop 132 to selectively attach to either set of the apertures 135 pairs and thus be attached to the adjustment plate 131 at two distinct heights.

When the selectively deployable wheel assembly attachment 100 attached to a conventional animal cage 101 with the auxiliary support assembly 130, the attachment plate 121 is fixed to one side of the cage 101 and the adjustment plate 131 is fixed to another side of the cage 101 such that the attachment plate 121 and adjustment plate 131 are positioned on orthogonal planes. The axle member 112 is slid through the axle tube 128'/axle loop 128, thereby operatively associating the wheel assembly 110 with the fixed attachment mechanism 120. The adjustment loop 132 is then positioned with its snap hooks 136 engaged to the pair of apertures 135 closer to the ground surface, extending down from the apertures to engage the axle member 112, as illustrated in FIG. 3, thereby supportably integrating the auxiliary support assembly 130 with the wheel assembly 110. Through this configuration, the wheel 111 can contact the ground surface, supporting the cage 101 off the ground and allowing the cage 101 to be rolled (it is contemplated that a cage 101 may outfitted with at least two selectively deployable wheel assembly attachments 100 to facilitate balanced rolling).

In embodiments with the auxiliary support assembly 130, when it is desired to not roll a cage 101, the selectively deployable wheel assembly attachment 100 can be reconfigured to not affect the stability of the cage 101 by sliding the axle member 112 out of the axle tube 128'/axle loop 128 (which also disassociates the axle member 112 with the adjustment loop 132), thereby removing the wheel assembly 110. The adjustment loop 132 can then be attached to the pair of apertures 135 furthest from the ground surface so that it does not hang past the bottom of the cage 101. Due to the rotational disposition of the attachment elbow 122, when the cage 101 is set down on the ground surface, it will simply rotate so as to allow the axle tube 128'/axle loop 128 to the storage position, with or without the wheel assembly 110 integrated therewith.

In alternate embodiments, it is contemplated that the attachment plate 121 may be constructed of a single plate or any number of stacked plates. Similarly, it is contemplated that the adjustment plate 131 may be constructed of a single plate or any number of stacked plates.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A selectively deployable wheel assembly attachment for attaching to an enclosure having at least a first side and a second side oriented on intersecting planes, comprising:
   a wheel assembly defining a wheel operatively associated with a rigid axle member;
   a fixed attachment mechanism defining an attachment plate having a rotatable attachment elbow extending therefrom, wherein said attachment plate is operative to attach to a first side of an enclosure;
   said attachment elbow configured to selectively receive the axle member so as to operatively associate the wheel assembly with the fixed attachment mechanism and enable the wheel assembly to move between a deployed position in which the wheel assembly is configured to support the enclosure off of a ground surface and a storage position in which the wheel assembly is configured to allow the enclosure to directly rest on the ground surface;
   an auxiliary support assembly defining an adjustment plate with a selectively attachable adjustment loop having at least one end, wherein said adjustment plate is operative to attach to a second side of the enclosure; and
   said adjustment loop adapted to engage the axle member so as to supportably integrate the auxiliary support assembly with the wheel assembly.

2. The selectively deployable wheel assembly attachment of claim 1, wherein said attachment plate includes a plurality of discrete component plates fixedly stacked together.

3. The selectively deployable wheel assembly attachment of claim 2, wherein said attachment plate includes at least a first component plate adjacent to a second component plate, with the first component plate having an arcuate recess sized to enable the placement of the attachment elbow between the first component plate and the second component plate.

4. The selectively deployable wheel assembly attachment of claim 3, wherein said attachment elbow includes an end ridge sized to prevent it from sliding out of the arcuate recess.

5. The selectively deployable wheel assembly attachment of claim 1, wherein said attachment elbow includes an axle tube suitable for allowing the axle member to be inserted therein and to rotate while positioned therein.

6. The selectively deployable wheel assembly attachment of claim 1, wherein the deployed position is defined by the enclosure being disposed on top of said axle member.

7. The selectively deployable wheel assembly attachment of claim 1, wherein said adjustment plate includes at least one height selecting aperture suitable to selectively receive one end of the adjustment loop.

8. The selectively deployable wheel assembly attachment of claim 7, wherein said adjustment plate includes a plurality of height selecting apertures oriented to enable the adjustment loop to attach to the adjustment plate in a plurality of distinct positions.

9. The selectively deployable wheel assembly attachment of claim 7, wherein the adjustment loop includes at least one snap hook which enables the end of the adjustment loop to attach to the at least one height selecting aperture.

10. The selectively deployable wheel assembly attachment of claim 7, wherein the adjustment loop defines a U shaped member having two ends and said adjustment plate includes at least one pair of height selecting aperture which together are suitable to selectively receive each end of the adjustment loop.

11. The selectively deployable wheel assembly attachment of claim 10, wherein the adjustment loop includes one snap hook at each end which enables the ends of the adjustment loop to each attach to one of the one height selecting apertures in a pair.

\* \* \* \* \*